United States Patent
Ponec et al.

(10) Patent No.: US 10,211,631 B2
(45) Date of Patent: Feb. 19, 2019

(54) VOLTAGE CLIPPING

(71) Applicant: Enphase Energy, Inc., Petaluma, CA (US)

(72) Inventors: Andrew Joseph Ponec, Salem, OR (US); Darren Hau, Los Gatos, CA (US)

(73) Assignee: Enphase Energy, Inc., Petaluma, CA (US)

( * ) Notice: Subject to any disclaimer, the term of this patent is extended or adjusted under 35 U.S.C. 154(b) by 338 days.

(21) Appl. No.: 14/572,722

(22) Filed: Dec. 16, 2014

(65) Prior Publication Data

US 2015/0171628 A1    Jun. 18, 2015

Related U.S. Application Data

(60) Provisional application No. 61/916,800, filed on Dec. 17, 2013.

(51) Int. Cl.
| | | |
|---|---|---|
| H02J 1/00 | (2006.01) | |
| H02J 3/00 | (2006.01) | |
| H02H 7/20 | (2006.01) | |
| H02H 9/04 | (2006.01) | |
| H02J 3/38 | (2006.01) | |

(52) U.S. Cl.
CPC ............. *H02J 1/00* (2013.01); *H02H 7/20* (2013.01); *H02H 9/045* (2013.01); *H02J 3/383* (2013.01); *Y02E 10/563* (2013.01); *Y10T 307/685* (2015.04)

(58) Field of Classification Search
CPC ......... H02J 1/00; H02J 3/383; Y10T 307/685; H02H 9/045; H02H 7/20
See application file for complete search history.

(56) References Cited

U.S. PATENT DOCUMENTS

| | | | | |
|---|---|---|---|---|
| 5,584,974 A | * | 12/1996 | Sellers .................... | H01J 37/34 204/192.12 |
| 8,102,074 B2 | | 1/2012 | Hadar et al. | |
| 8,274,172 B2 | | 9/2012 | Hadar et al. | |
| 8,570,017 B2 | | 10/2013 | Perichon et al. | |
| 2006/0164065 A1 | * | 7/2006 | Hoouk ..................... | G05F 1/67 324/76.17 |
| 2008/0169784 A1 | * | 7/2008 | Chung ..................... | H02J 7/35 320/101 |

(Continued)

FOREIGN PATENT DOCUMENTS

| | | |
|---|---|---|
| AU | 2009202125 | 12/2009 |
| CN | 102598287 A | 7/2012 |

(Continued)

OTHER PUBLICATIONS

International Preliminary Report on Patentability for PCT Patent Application No. PCT/US2014/070987, dated Jun. 30, 2016, 10 pgs.

(Continued)

*Primary Examiner* — Alfonso Perez Borroto
*Assistant Examiner* — Esayas Yeshaw
(74) *Attorney, Agent, or Firm* — Moser Taboada

(57) ABSTRACT

A photovoltaic (PV) module can include a plurality of solar cells and circuitry configured to switch between a first state in which output voltage from the PV module includes voltage from the plurality of solar cells and a second state in which the output voltage includes voltage from fewer that all the plurality of solar cells.

19 Claims, 9 Drawing Sheets

(56) References Cited

U.S. PATENT DOCUMENTS

| | | |
|---|---|---|
| 2010/0147354 A1 | 6/2010 | Takehara et al. |
| 2010/0152917 A1* | 6/2010 | Kernahan .......... H01L 31/02021 700/297 |
| 2011/0073150 A1* | 3/2011 | Hightower ................ G05F 1/67 136/244 |
| 2011/0079263 A1* | 4/2011 | Avrutsky .......... H01L 31/02021 136/244 |
| 2012/0126624 A1* | 5/2012 | Hester ...................... G05F 1/67 307/77 |
| 2012/0194003 A1* | 8/2012 | Schmidt ............ H01L 31/02021 307/116 |
| 2012/0228951 A1 | 9/2012 | Lehmann |
| 2012/0235477 A1* | 9/2012 | Korman .................. H02S 40/32 307/11 |
| 2012/0242303 A1* | 9/2012 | Ishii ......................... G05F 1/67 323/234 |
| 2012/0298166 A1* | 11/2012 | Chen .................... H01L 31/044 136/244 |
| 2013/0049710 A1 | 2/2013 | Kraft et al. |
| 2013/0163137 A1 | 6/2013 | Johnston et al. |
| 2013/0200710 A1 | 8/2013 | Robbins |
| 2013/0307342 A1 | 11/2013 | Niemela |
| 2013/0321013 A1* | 12/2013 | Pisklak .................. H02S 50/00 324/750.3 |
| 2014/0293491 A1* | 10/2014 | Robbins .................. H02H 7/00 361/54 |
| 2015/0101761 A1* | 4/2015 | Moslehi ................ F24J 2/0422 160/107 |
| 2015/0130281 A1* | 5/2015 | Sabripour ................ H02J 3/32 307/66 |
| 2015/0171628 A1 | 6/2015 | Ponec et al. |
| 2015/0349709 A1* | 12/2015 | Ponec .................... H02S 40/32 136/244 |

FOREIGN PATENT DOCUMENTS

| | | |
|---|---|---|
| CN | 103208916 A | 7/2013 |
| EP | 2680020 | 1/2014 |
| JP | H05284668 | 10/1993 |
| JP | 20000114567 A | 4/2000 |
| JP | 2006287164 A | 10/2006 |
| JP | 2007133765 | 5/2007 |
| JP | 2012178535 A | 9/2012 |
| JP | 2013-252046 | 12/2013 |
| WO | WO-2013041871 | 3/2013 |

OTHER PUBLICATIONS

International Search Report and Written Opinion for PCT Patent Application No. PCT/US2014/070987, dated Mar. 27, 2015, 12 pgs.
Extended European Search Report from European Application No. 14871646.7 dated Oct. 21, 2016, 8 pgs.
Second Office Action from Chinese Patent Application 2014800617480, dated Jan. 24, 2018, 9 pgs.
Notice of Second Office Action from Chilean Patent Application No. 01399-2016 dated Oct. 18, 2017, 5 pgs.
First Office Action for Mexican Appl. No. MX/a/2016/007330 dated Jul. 6, 2018; 5 pgs.
Examination Report from Australian Patent Application No. 2014364597, dated Feb. 9, 2018, 4 pgs.

* cited by examiner

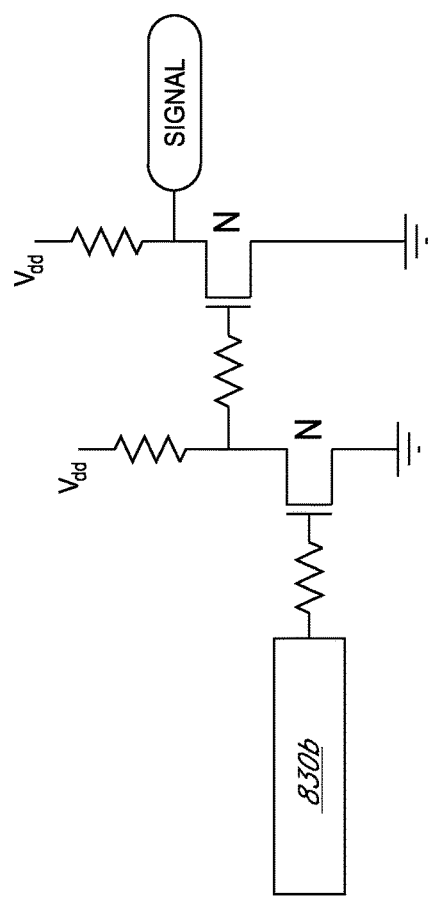
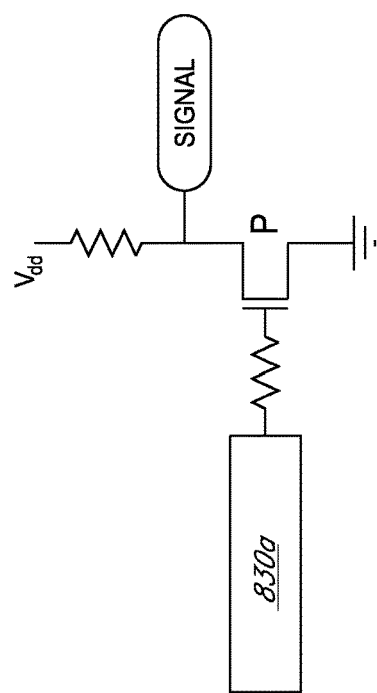
FIG. 8

VOLTAGE CLIPPING

PRIORITY CLAIM

This application claims the benefit of U.S. Provisional Application No. 61/916,800, filed Dec. 17, 2013, entitled "System, Method, and Computer Program Product for Controlling Voltage of DC Power Sources and Bypassing Series-Connected Power Sources", by Ponec et al., the entire contents of which are hereby incorporated by reference.

BACKGROUND

Solar cells can be connected in series to form a photovoltaic ("PV") string. The PV string can include several solar cells and/or PV modules, with each PV module comprising solar cells mounted on the same frame. In a PV string, the positive terminal of one solar cell is electrically connected to the negative terminal of another solar cell, the positive terminal of the other solar cell is electrically connective to the negative terminal of yet another solar cell, and so on. The output voltage of a PV string depends on the number of solar cells in the string.

In a series-connected string of direct current ("DC") power sources, the voltage of each source adds to produce the voltage delivered to a load. In solar energy systems, solar modules, also referred to herein as PV modules, are typically connected in series to provide voltage to the load (e.g., an inverter, a battery system). Each PV module can include one or more cell strings coupled in series with each cell string including one or more solar cells coupled in series. Typically, each string of PV modules is connected to an inverter, or multiple strings of PV modules are coupled in parallel at a combiner box, and one or more combiner boxes lead to a central inverter. In some instances, a system may have a maximum voltage limit, for example, due to hardware (e.g., inverter) limitations, safety, and/or reliability reasons. Accordingly, the number of PV modules and/or cell strings that can be connected in series can be limited by that maximum voltage.

The maximum voltage produced by a series of solar cells can occur when the system is producing no current and each solar cell operates at its open-circuit voltage ($V_{OC}$). This condition can occur due to an inverter shutdown, system damage, or during transient measurements taken by the inverter to understand system performance, among other reasons. Systems must be designed to accommodate the maximum voltage condition even though it often does not occur. Additionally, the maximum voltage produced by solar cells increases at low temperatures, leading to an additional derate factor that limits the number of series-connected solar cells. As a result, systems must be designed with a voltage buffer to accommodate $V_{OC}$. Inefficiencies resulting from the overdesign include fewer modules per string of modules, oversized wiring, among other inefficiencies, which lead to a higher balance of system (BOS) cost.

Moreover, in some instances, one or more of the cells in a string can underperform due to soiling, shading, defects, and/or damage, which can limit the performance of a cell string and/or module. If the current of the cell is reduced enough, the cell can operate in reverse bias and may even reach reverse breakdown. A cell in reverse bias can cause hot spots, which can severely damage the PV module.

BRIEF DESCRIPTION OF THE DRAWINGS

FIGS. 6-9 illustrate schematic diagrams of example fail-safe implementations of systems described herein, according to some embodiments.

DETAILED DESCRIPTION

Figure 1:
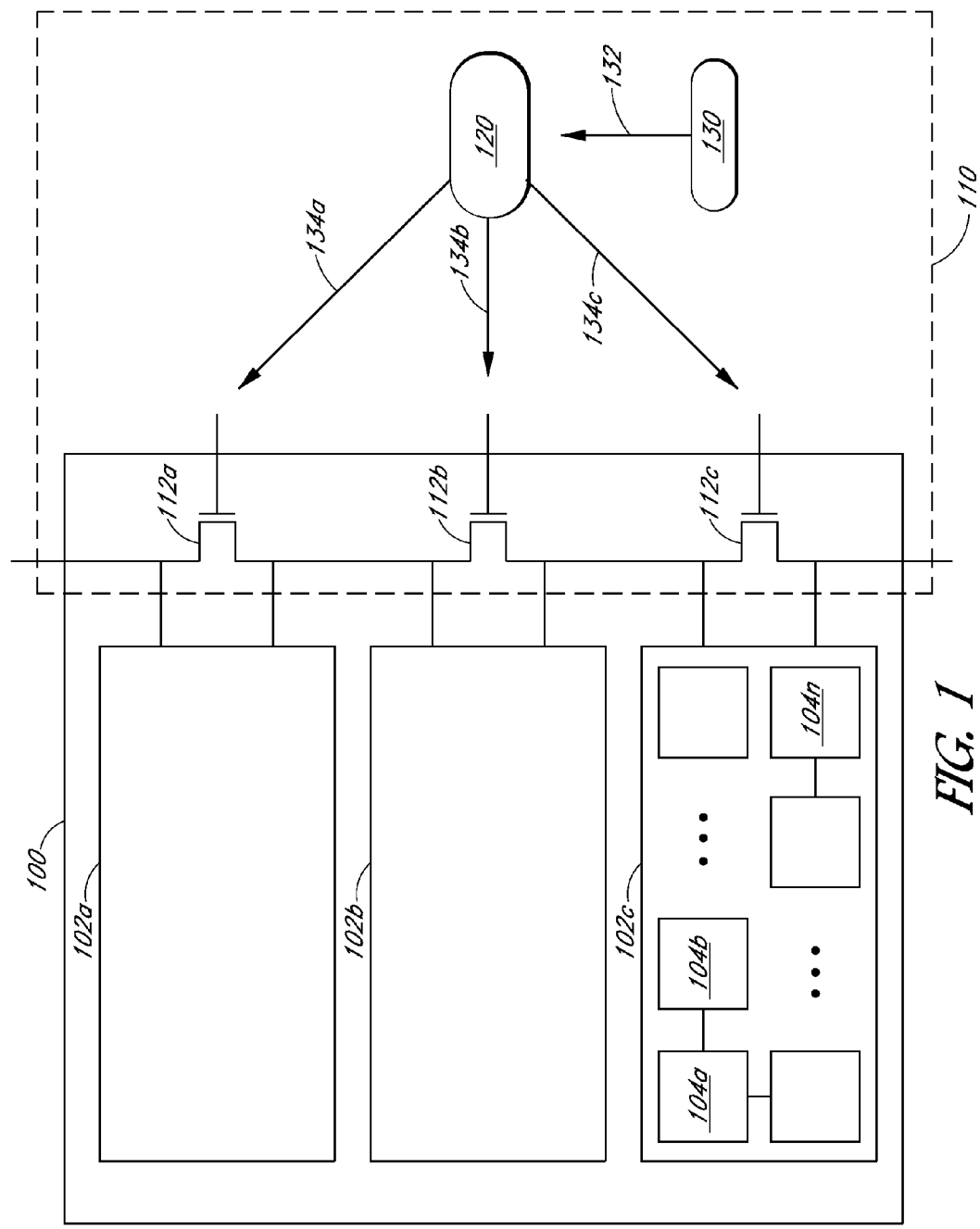
FIGS. 1-3 illustrate block diagrams of example circuitry configured to perform voltage clipping, according to some embodiments.

The following detailed description is merely illustrative in nature and is not intended to limit the embodiments of the subject matter of the application or uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology

The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" string of solar cells in a PV module does not necessarily imply that this string is the first string in a sequence; instead the term "first" is used to differentiate this string from another string (e.g., a "second" string).

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled." The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

This specification first describes structures and techniques for bypassing series-connected solar cells to clip voltage and/or to address hot spots. The specification then describes several fail-safe modes for the system, followed by example methods of bypassing the solar cells. Various examples are provided throughout.

For context, one way to manipulate the output of a PV module is to use a power converter that processes the power of a module using a DC-DC converter. Effectively, such systems change the shape of the IV curve so that is has more current and less voltage. These power converter devices incur losses, and the electrical and thermal requirements of such devices place inherent limits on how cost-effective such power converters can be. Moreover, because the voltages in a system using a DC-DC converter always pass through the DC-DC converter, some voltage loss occurs even when reducing the voltage output of the PV module is not required. As a result, power optimizers and microinverter technologies that can manipulate voltages may not be cost-effective, especially in sectors in which electricity prices are relatively low, such as in large-scale commercial or utility solar sectors.

Turning now to FIG. 1, a PV module with example circuitry configured to clip voltage is illustrated. In some embodiments, a PV module, such as PV module 100, can be subdivided into several grouping of solar cells, referred to as cell strings, such as strings 102a, 102b, and 102c. Cell strings can include a plurality of series-connected solar cells, for example, 10-40 individual series-connected solar cells, as shown in string 102c by solar cells 104a, 104b, . . . , 104n. Generally speaking, the number of solar cells in a string, and the number of strings in a PV module, determines the voltage produced by the string and PV module, respectively. Although the example PV module of FIG. 1 illustrates three strings of solar cells, in other embodiments, a different number of strings can be coupled in series in a PV module.

In one embodiment, circuitry 110, also referred to herein as voltage clipping or overvoltage circuitry, can be configured to protect one or more cells, strings, and/or modules against operating in a overvoltage condition (or as described later, against operating in a reverse bias, hot spot condition). Circuitry 110 can include a parallel current path provided across each cell string such that the output of the respective cell string can be included or excluded from the output of the PV module, for example, based on the configuration of one or more switches. The parallel current path can be configured to lower the total impedance on the cell string's output, which can lower the generated voltage of the PV module. In other embodiments, the parallel current path can be provided across the entire PV module, a plurality of cells, a plurality of strings, or plurality of modules, to achieve a similar effect.

In some embodiments, circuitry 110 can be configured to switch between various permutations of the parallel path. For example, circuitry 110 can be configured to operate in and switch between a first state in which the PV module's output voltage includes voltage from all of the plurality of solar cells (e.g., each string), and one or more other states in which at least some of the solar cells are bypassed from providing voltage to PV module's output voltage. For example, circuitry can be configured to operate and switch between a state in which the PV module is configured to output from all of its solar cells, a state in which the PV module outputs from two-thirds of its solar cells, and another state in which the PV module outputs from one-third of its solar cells. As another example, circuitry can be configured to operate and switch between two states, one in which the PV module output from all of its solar cells and another in which the PV module is configured to output from fewer than all of its solar cells (e.g., approximately 75% of its solar cells).

In one embodiment, with one or more switches of circuitry 110 enabled, the parallel current path can take all or nearly all of the cell string's current to reduce or minimize the voltage of the string, which can result in the PV module's voltage output to drop to approximately 75% of its $V_{OC}$ output. Unlike a DC-DC converter, the parallel current path does not require energy storage elements such as capacitors or magnetic elements, thereby easing electrical requirements. Additionally, limiting module voltages without using a switching power supply can offer the advantage of producing minimal electromagnetic interference (EMI), which can simplify the design requirements and minimize interference with other electronics equipment, such as communications equipment. Moreover, also unlike a DC-DC converter, the same IV curve is used but the PV module is effectively made smaller.

Figure 3:
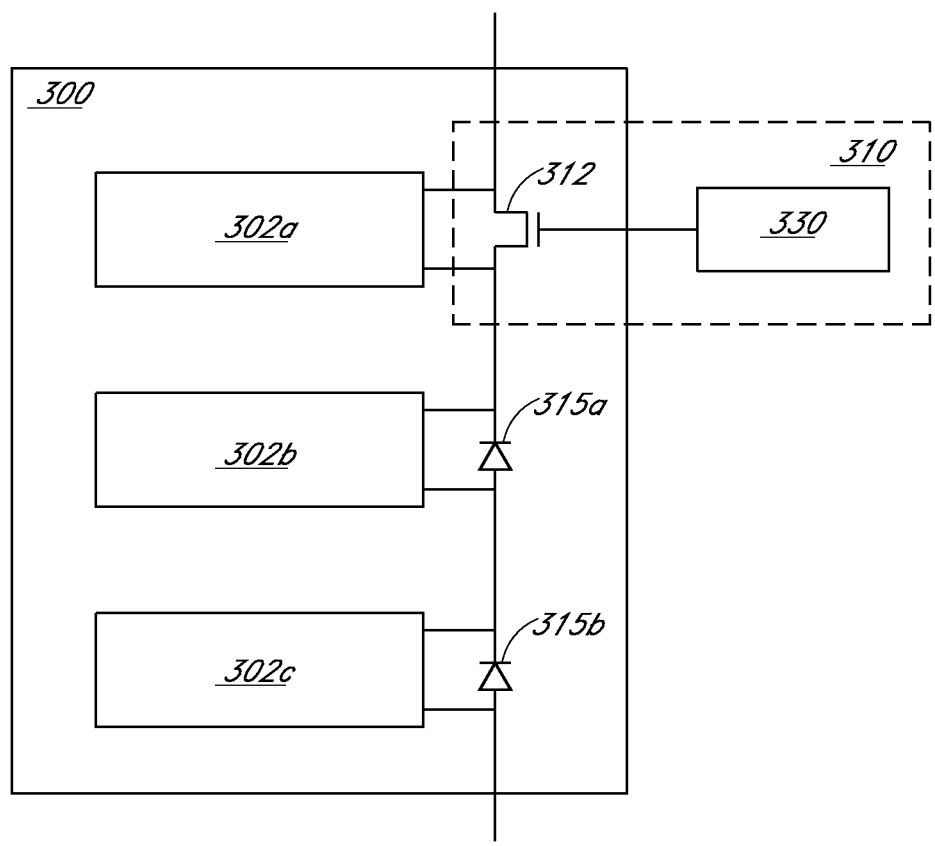

In one embodiment, the parallel current path can be implemented, using a switch or switches, such as relays, field effect transistors (FETs), bipolar junction transistors (BJT), insulated-gate bipolar transistors (IGBT), or other switching mechanisms. Accordingly, one or more solar cells can be shorted (e.g., bypassed) by closing a switch (e.g., switch 112a, 112b, and/or 112c) across the one or more solar cells to enable the parallel current path. Switches are illustrated in FIG. 1 as FETs 112a, 112b, and 112c. As shown in the example of FIG. 1, each cell string can associated with a respective switch. In other embodiments, that is not necessary the case, as is illustrated in FIG. 3.

In one embodiment, circuitry 110 can include an analog or digital controller 130 configured to provide a signal to driver 120, which can be configured to turn on (e.g., enable, engage, close, activate), as shown by signals 134a, 134b, and 134c, the switch(es) to short a cell string thereby reducing the voltage contribution from that cell string to approximately zero volts. As used herein, driver 120 can be circuitry (e.g., one or more transistors) configured to level shift the controller 130 output to command the switch to turn on or off. Although the switching is described as being performed on an entire cell string, in some embodiments, switching can be performed at the cell level, at the module level, or in some combination of cell level, string level, and/or module level.

In various embodiments, the controller (e.g., analog or digital) can be implemented using hardware, firmware, software, or some combination thereof. In one embodiment, the controller can be configured to determine that the parallel path can be safely turned off (e.g., opened, disable, disengaged, deactivated) and when the parallel path should be engaged to short one or more cells and clip the output voltage of those one or more cells (and, as a result, the module and system). In some embodiment, the controller can be configured to select which string of cells to clip, as described in more detail below.

In one embodiment, the determination on whether to turn on or off the switch to engage or disengage the parallel path can be based on voltage and/or current measurements. As an example, a voltage sense mechanism (not illustrated) can be coupled to a cell string to measure the voltage contribution of that string. Based on that voltage, the controller can determine whether to clip the string's voltage. For instance, if the measured voltage exceeds a threshold value (e.g., the maximum power point voltage, $V_{mpp}$ of the string or module), then one of the cell strings can be bypassed.

As another example, a separate voltage sense mechanism can be coupled to each respective string in a module. If the sum of the measured voltages exceeds a threshold value for the module, then one or more of the cell strings can be bypassed by enabling the parallel path. In any of the examples, by bypassing one or more strings to reduce the voltage to a level below the threshold voltage, the amount of power harvested from the entire module can be maximized while ensuring the threshold value is not exceeded. Additionally, as described in more detail below, if a hot spot is detected (e.g., if the measured voltage drops below 0V), then the cell string for which the measurement was made can be bypassed by enabling the parallel path for that string.

In some embodiments, after a switch is engaged and the parallel path is enabled, the controller may no longer have access to the open-circuit voltage measurement. Accordingly, the controller may no longer be able to determine if the switch can safely be disengaged and return to normal operation. Various techniques can be implemented to determine when the switch can be safely disengaged. For example, disengagement of the switch can be based on a timer, based on current measurements, or based on measurements of two of the strings at a time. Various techniques and examples of determining when to disengage the switch(es) are described in more detail below at FIG. 10.

In various embodiments, each PV module can include a respective local controller as part of the module (e.g., in the junction box, in the laminate) or an external controller can be provided to control one or more modules. In one embodiment, opening or closing of the switch can be controlled by a central controller through wired or wireless (e.g., Zigbee, mesh network, WiFi, Bluetooth, etc.) communication to distributed circuitry (e.g., voltage clipping devices).

In some embodiments, some combination of local and external controllers can be used to engage and disengage the parallel paths. For instance, determination of whether to open or close a switch can be performed by a local controller based on one or more parameters (e.g., threshold voltage) provided by a central controller.

In one embodiment, controllers can coordinate with one another such that the collective system voltage is below a system threshold voltage. For example, local controllers at each module can communicate with one another to coordinate or a central controller can communicate with respective local controllers to provide an indication of which switches should open and which should close. Accordingly, by coordinating voltage clipping at the system level, the total number of strings that are shorted can be minimized to keep the total system within its voltage limits Such a control technique can help inhibit unnecessarily limiting the power generated by the system by not clipping module voltage from some modules that may otherwise be clipped if the modules were considered independently of other modules. Note that system level coordination can refer to a system of PV modules coupled to some downstream hardware, such as an inverter, combiner box, etc. The system level coordination need not be coordination for all PV modules at a PV power plant, for example. Instead, the system level coordination may be coordination for a subset of those PV modules.

In various embodiments, the voltage limiting circuits in a solar energy system can be configured to limit the voltages of respective solar cells at different levels such that during common operating conditions, some, but not all voltage-limiting circuits are activated.

In some embodiments, one or more cell strings can be accessed through a junction box, such that the voltage and current provided by the strings can be coupled to a load external to the PV module. In one embodiment, circuitry 110 can be housed in the junction box. In one embodiment, the junction box can include a plurality of bypass diodes (e.g., one bypass diode per string), which can conduct electricity if the associated cells are operating in reverse bias. As described herein, the disclosed structures and techniques can be used in conjunction with or instead of bypass diodes and offer reverse bias protection.

Note that in some embodiments, instead of circuitry 110 being located in a junction box, one or more components of the overvoltage protection device can be located in other locations, such as in the encapsulation of the PV module, or external to the PV module.

Figure 2:
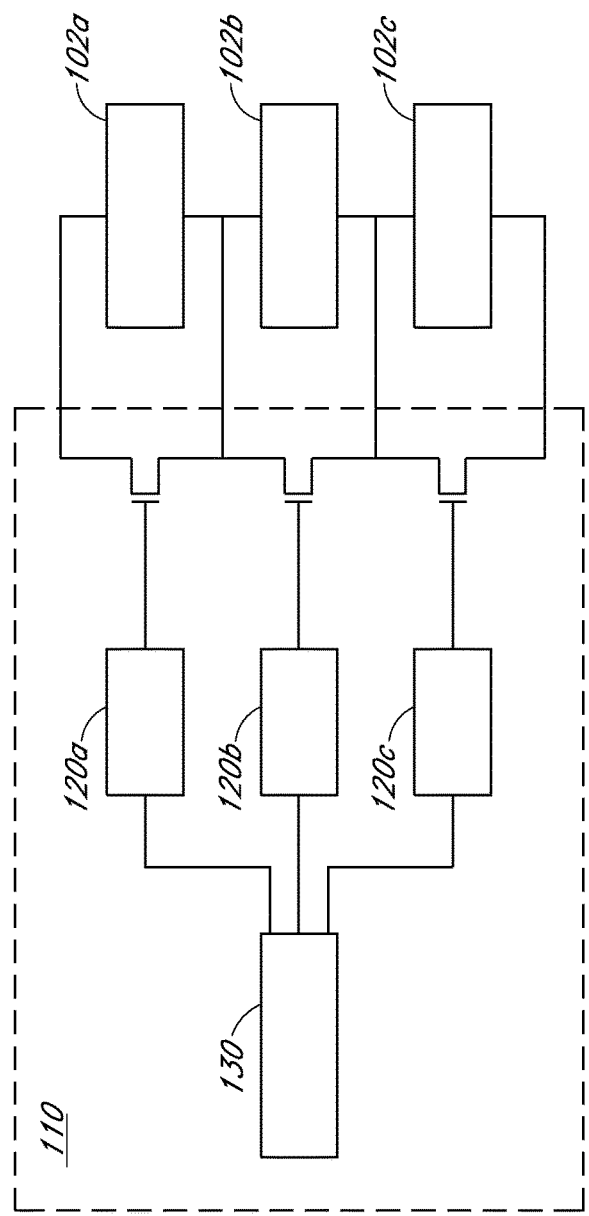

FIG. 2 illustrates another example of circuitry configured to clip voltage. For ease of explanation and illustration, the actual PV module and individual solar cells are not illustrated in FIG. 2. Moreover, the description of various elements of FIG. 1 (e.g., parallel path, switches, controller, etc.) applies equally to other Figures in this specification but may not be repeated for clarity of description.

One difference in the example circuitry 110 of FIG. 2 is the use of a separate driver for each switch. As shown, controller 130 is configured to provide signals to the separate drivers, drivers 120a, 120b, and 120c. Each of drivers 120a, 120b, and 120c can then be configured to command their respective switch on or off in response to the signal from controller 130.

Note that the disclosed circuitry and parallel current path need not affect all of the cells in a string or module. For example, the voltage clipping ability provided by the parallel current path can be used on just a subset of cells in a string, module, or solar energy system as shown in FIG. 3. As shown in FIG. 3, circuitry 310 is configured to switch PV module 300 between a full power state in which all of the solar cells of PV module 300 are configured to provide voltage to the module's output and a state in which string 302a is clipped from providing its voltage to the module's output. In such an embodiment, controller 330 can directly enable or disable switch 312 without the use of a separate driver. In the illustrated example, separate switches do not exist for strings 302b and 302c to clip the voltages of those strings. Instead, there are two main states, a state in which the full voltage from all three strings is output, and another state in which the voltage from two of the strings is output. Hot spot protection for strings 302b and 302c can be provided by bypass diodes 315a and 315b, respectively. A bypass diode can also be used for hot spot protection for string 302a, or circuitry 312 can provide such protection.

As a practical example of FIG. 3, in one embodiment, the switch can be associated with a string of solar cells that makes up approximately 25% of the solar cells in the module. That string can be shorted if the voltage of that string (or of the whole module) exceeds a threshold voltage. If that string is shorted, approximately 75% of the solar cells provide their voltage to the module's output. In one embodiment, the threshold voltage can be approximately the $V_{mpp}$ of the PV module or the $V_{mpp}$ of the string, among other examples. For example, if $V_{mpp}$ of the module is 60V and the threshold voltage is 62V, the switch can be closed if the measured voltage meets or exceeds 62V such that the shorted string of solar cells does not contribute to the output voltage of the module. Accordingly, it can be ensured that the module does not operate above 62V so that the module does not reach $V_{OC}$ and the system (e.g., BOS components) does not need to be sized to accommodate $V_{OC}$.

Instead of modifying the IV curve as in a DC-DC-converter-based system, the disclosed system effectively operates between separate IV curves. One advantage of the parallel path switching mechanism to clip voltage over DC-DC converter systems is that for DC-DC converter systems, the operating current as modified for each module must be the same. Such a limitation does not exist for the disclosed system.

The disclosed structures and techniques can offer the ability to limit voltage in overvoltage cases in which the system is performing sub-optimally and maximizing energy harvest is not as important, but without the cost and efficiency penalties of DC-DC power optimizers. In contrast to DC-DC-optimizer-based systems in which the output voltage always passes through the DC-DC optimizer and suffers at least some efficiency loss in terms of lost voltage even when not needed, the disclosed overvoltage protection can be utilized in response to the voltage exceeding a threshold but not under normal operation conditions such that voltage is not unnecessarily lost under normal operating conditions.

In some embodiments, the switches that are placed in parallel with the solar cells to provide a pathway and limit output voltage to meet system design constraints can also be used for safety shutdown of the system. By using the switches to significantly reduce impedance of or to fully short cell strings, the output voltage and power of the solar system can be drastically reduced. Safety shutdown can be used, for example, during a fire, when an arc-fault is detected, during maintenance of the system, or for other safety reasons. In one embodiment, the controller can default to a position in which one or more cell strings are effectively shorted.

In various embodiments, similar structures and techniques can be used to address reverse bias, hot spot heating on solar modules. As noted above, when a solar cell underperforms, for example, due to shading or defects, the solar cell can operate with a lower current than the surrounding cells, which can cause the cell to be placed in reverse bias. Reverse bias can cause significant power loss and heating in the cell, damaging the cell or the surrounding solar module structure.

Note that a similar effect can occur due to failures of junctions or solder joints within the solar module. For context, some systems utilize bypass diode to handle hot spot heating. For instance, if the cell string cannot produce enough current to reach the maximum power point current, $I_{mpp}$, of the other cell strings, and the voltage drop across the diode is less than the reverse bias voltage of the solar cells in the cell string, then the bypass diode is forward biased to short the cell string. The voltage drop (e.g., approximately 0.3V-0.5V) associated with such diodes, however, causes power loss through heat dissipation. Heat dissipation can cause solar module efficiency to drop and result in overheating, which can even destroy a diode. If the diode fails short, a significant portion of the PV module's power can be permanently lost. If a diode fails open, the associated cell string is left vulnerable to solar cell hot spots, which can potentially destroy the PV module.

Figure 4:
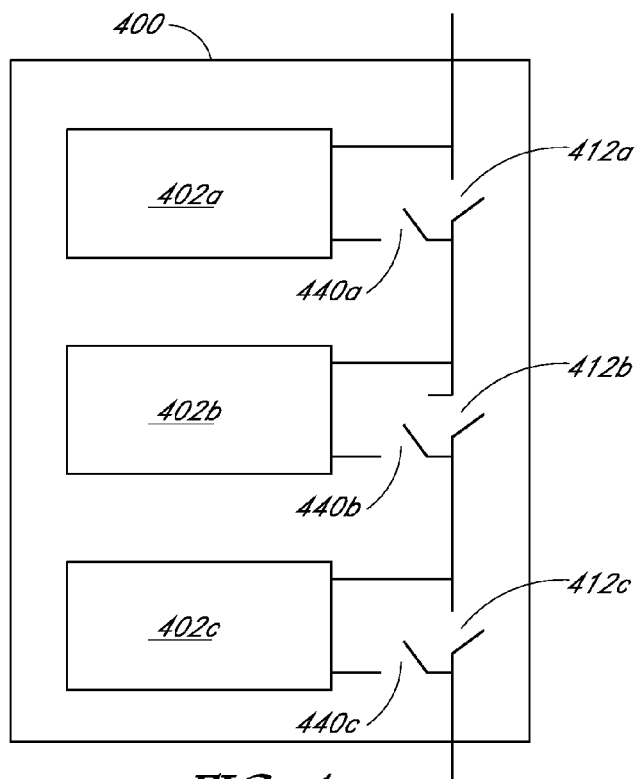
FIGS. 4-5 illustrate block diagrams of example circuitry configured to bypass one or more solar cells in response to a hot spot condition, according to some embodiments.

To address some of the limitations of using bypass diodes for hot spots, the disclosed circuitry, parallel conducting path, and techniques can be used to inhibit hot spots. FIG. 4 illustrates one such example.

In one embodiment, to inhibit hot spot heating, the current of the cell can be limited to prevent the reverse bias condition to inhibit power loss and reduce heating. The circuit can be broken to limit the current through the cell string(s) 402a, 402b, and 402c, respectively, as shown by breaking switches 440a, 440b and 440c in FIG. 4. While FIG. 4 demonstrates mitigating hot-spot conditions at the cell string level, a similar protection mechanism can be implemented on other lengths of cells, such as across an entire PV module.

However, breaking the circuit completely can lead to unacceptable power loss in surrounding solar cells and modules. The bypass switches 412a, 412b, and 412c that provide a parallel path for voltage clipping purposes can be used to provide a path for the current from well-performing solar cells to bypass solar cells that have been removed from the circuit to prevent hot spots. As shown in FIG. 4, a hot spot condition for a cell string can be alleviated by shorting the parallel conduction path and breaking the circuit through the cell string. Moreover, once a hot spot is detected (e.g., from current and/or voltage measurements or other sensors), the controller can configure breaking switches 440a, 440b, and/or 440c and/or bypass switches 412a, 412b, and/or 412c to place a cell string that contains a hot spot in a safe (e.g., limited current) position until a maintenance visit or other diagnostic test fixes the problem or determines that the hot spot condition is no longer present.

Moreover, note that an analogous situation exists for clipping current when current exceeds a threshold level. For example, in one embodiment, a path with variable impedance can be placed in parallel to the main current path. The impedance can be controlled through analog or digital control signals. Decreasing the impedance of the parallel path diverts current from the main path, lowering the current through the main path, Increasing the impedance of the parallel path causes current to favor the main path, increasing current through the main path.

Using switches to bypass cell strings, for example, for handling hot spots, can reduce the voltage drop to 50 mV or less as compared to about 0.5V in systems using bypass diodes. Moreover, by using the disclosed parallel path configuration, bypass diodes can be replaced with a switch, such as a relay, FET, BJT, or IGBT across cell strings, or bypass diodes can be used as a backup to the disclosed circuitry. The switch can be turned on to short a string and bypass that string, as described herein.

In one embodiment, a conventional diode (e.g., silicon, Schottky) can be arranged in parallel with the bypass switch to act as a backup to the bypass switch. This function can also be satisfied in some implementations by the body diode of some switches (e.g., FETs), which have the proper characteristics.

Figure 5:
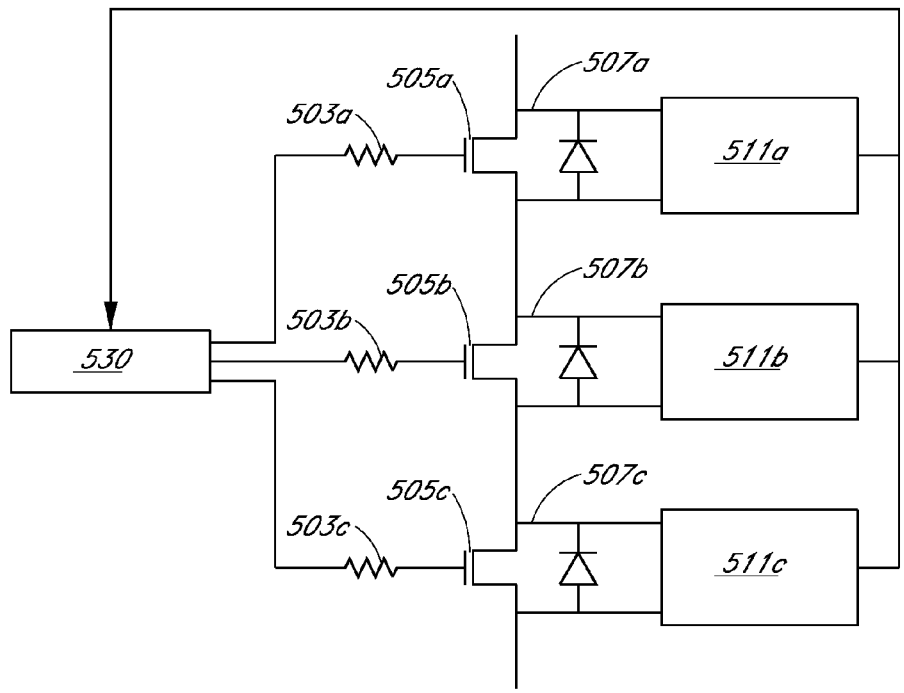

An analog or digital controller can determine the conditions in which it is safe to turn off the switch, and when the cell string should be bypassed by turning on the switch. The state can be determined by voltage and/or current measurements. FIG. 5 illustrates an example of such a bypass control mechanism and circuitry, whereby the controller 530 uses a voltage sense 511*a*, 511*b*, and 511*c* on each cell string to measure the voltage drop across the body diode of the FET that functions as the switch. If the voltage across the body diode is within a particular range, a bypass condition may be present. The controller 530 can then generate a signal to turn on the bypass FET, such as bypass FET 505*a*, 505*b*, or 505*c*, so that the FET conducts the majority of the current to reduce the voltage drop and thereby reduce the power dissipated during bypass. In one embodiment, a separate diode can be used in place of the body diode of the FET.

In some embodiments, a fail-safe mechanism can be provided for the voltage clipping or hot spot prevent circuitry such that if the loss of a control signal occurs, the system can be placed in a safe state (e.g., placing the parallel switches into an "on" state in the event of loss of power to the control circuitry). Because, in some implementations, the switches are driven on (e.g., activated, shorted, engaged) by a digital (e.g., microcontroller) or analog controller, the switches may stay off (open) if the driving source loses power. In the event that the driving source loses power, the switches can be configured to turn on to limit the voltage of the PV module and protect the module.

Figure 6:
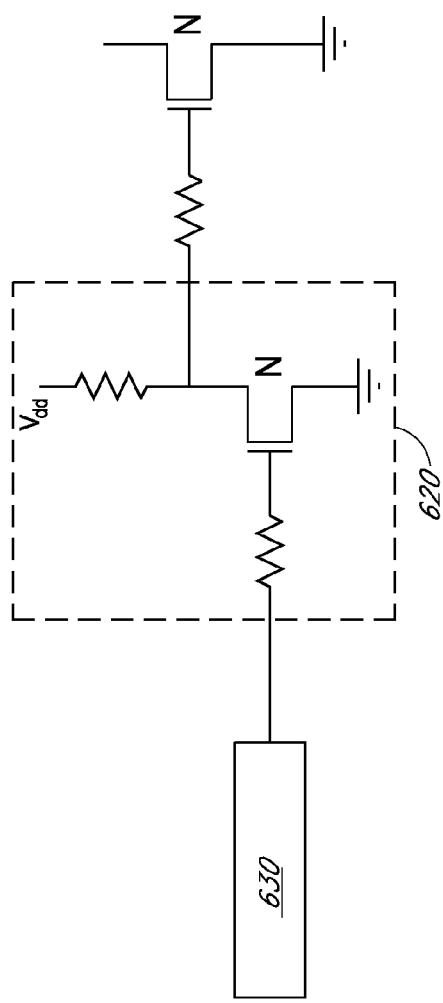

FIG. 6 illustrates an example in which a switch in the voltage clipping circuit is an N-channel enhancement-mode FET (bypass FET). In one embodiment, the FET can ordinarily be driven by another N FET controlled directly by a microcontroller or other signal-generating circuitry. If the controller 630 loses power, the driving N FET will stay open. A pull-up resistor coupled between VDD and the source of the driving N FET can be used to turn on the bypass FET in the event of such a failure. Accordingly, the bypass N FET can be shorted in the case of its driver losing power, by keeping the primary gate high through a pull-up resistor, and using a secondary, driving N FET to drive the primary gate low during normal operation. Other variations also exist.

Figure 7:
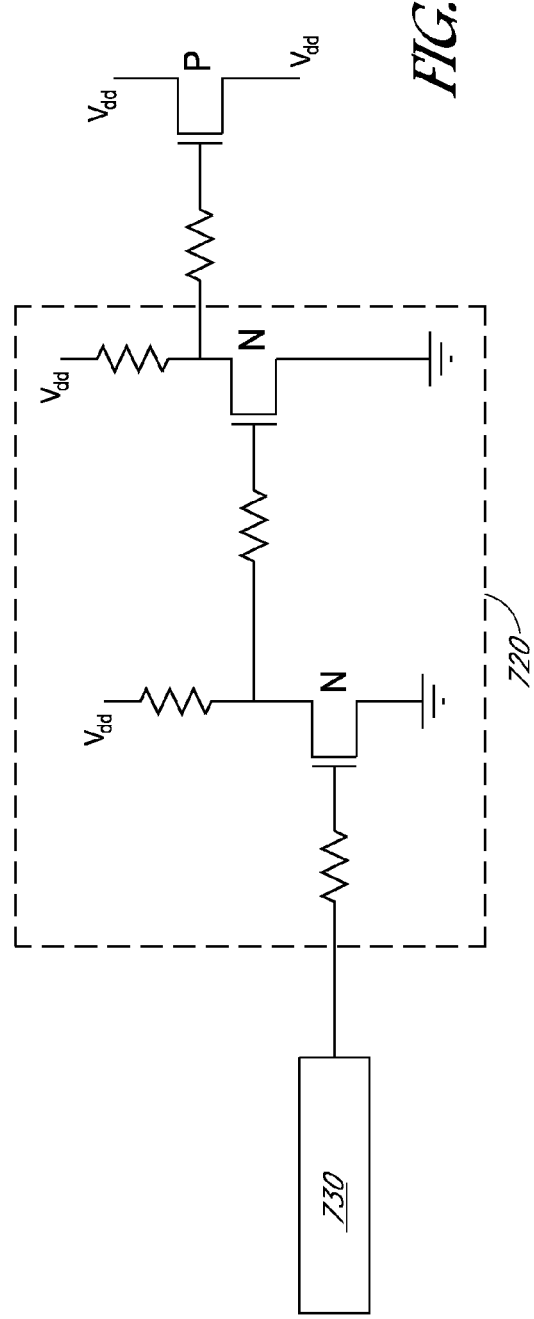

FIG. 7 illustrates another fail-safe driver example in which the bypass FET is a P-channel depletion-mode FET. In such an example, the bypass FET can ordinarily be driven by a network of two N FETs emulating the operation of a P FET. If the controller 730 loses power, then the first N FET stays open and the first pull-up resistor drives the second N FET on. The second N FET can pull the gate of the bypass P FET low to turn on the P FET. Accordingly, the primary P FET is shorted in the case of its driver losing power, by keeping the primary gate low through a secondary N FET that is kept shorted due to a pull-up resistor keeping the secondary gate voltage high, and using a tertiary N FET to drive the secondary gate low (and thus the primary gate high) during normal operation. Other variations also exist.

In some embodiments as shown in the left hand portion of FIG. 8, when the common terminal of a P FET must be GND, the gate of the P FET may not be driven without generating a negative voltage. To solve that issue, a system of N FETs can be used to emulate a P FET and generate the negative voltage compared to the source of the P FET as shown the right hand portion of FIG. 8.

Figure 9:
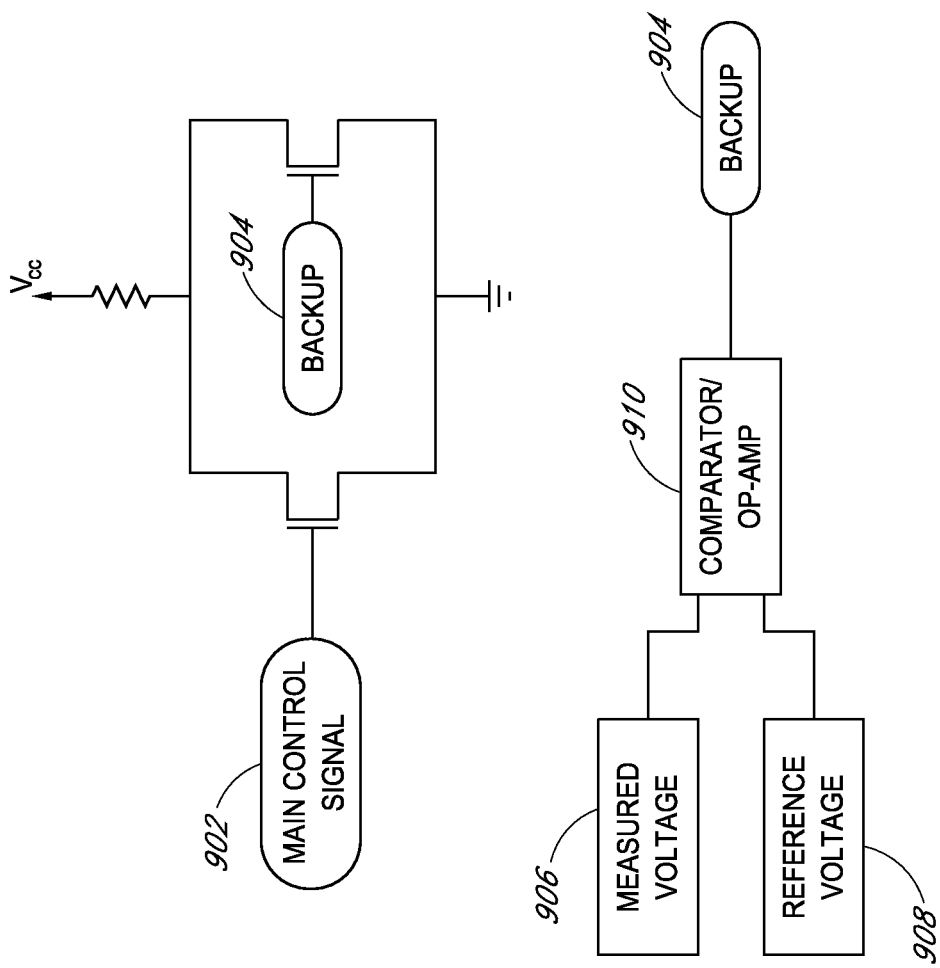

In some embodiments, a fail-safe mechanism can include providing a redundant control system, analog or digital, that can be used to prevent overvoltage from reaching the load. The added layer of protection can take the form of a zener diode controlling a switch that is configured in parallel with a cell string, or a second digital controller that measures or receives an indication of the voltage and controls a switch that can short a cell string. FIG. 9 illustrates an example of a backup analog fail-safe mechanism. If the main control signal 902 fails and the main controlling FET stays open, a wired-OR configuration can allow an analog backup signal 904 to control a backup FET. This analog control is implemented by comparing the measured voltage 906 with a reference voltage 908 through a comparator, op-amp, or similar device 910. If the measured voltage exceeds the reference voltage, the comparator can generate a backup signal 904 that turns the backup FET on, effectively engaging the switch.

Although the described fail-safe structures and techniques assume that the switches default to an "on" state with no power, in other embodiments, the drive circuitry can cause the switches to default to an "off" state if no power is provided to the control circuitry. Or, in some embodiments, switch(es) that default to an "on" state naturally, such as depletion-mode FETs, can be used without the use of drive circuitry and/or pull-up/pull-down resistors.

Figure 10:
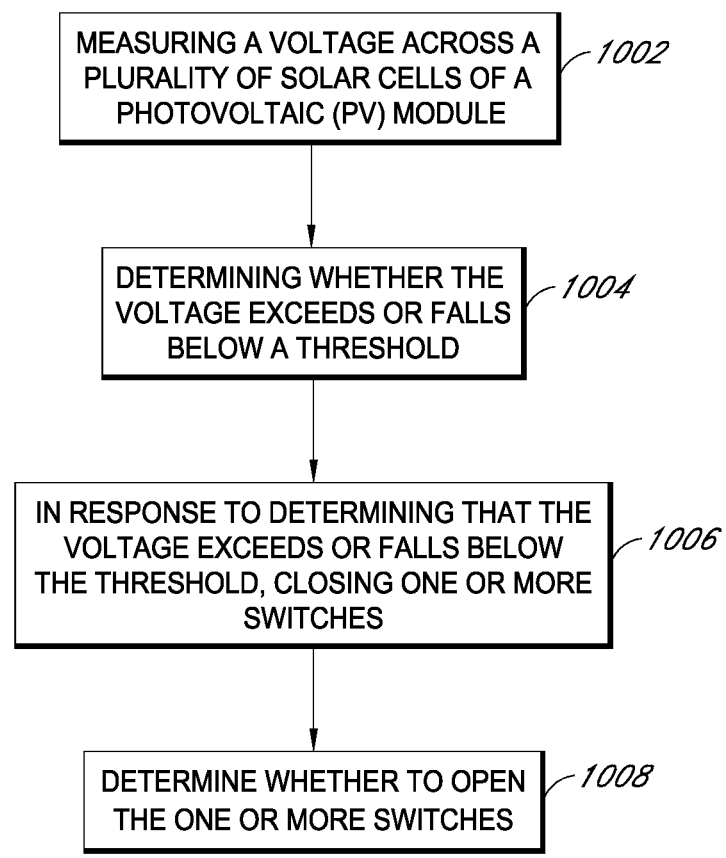
FIGS. 10-11 are flowcharts illustrating example methods of bypassing solar cells, according to some embodiments

Turning now to FIG. 10, a flow chart illustrating a method for clipping voltage and/or otherwise bypassing solar cells in a PV module is shown, according to some embodiments. In various embodiments, the method of FIG. 10 may include additional (or fewer) blocks than illustrated.

At 1002, a voltage can be measured across a plurality of solar cells of a PV module. In various embodiments, the voltage can be measured across a cell, a single string of solar cells, multiple strings of solar cells, each string of solar cells in a PV module, or across one or more modules. In one embodiment, the voltage can be measured with a voltage sensing circuit that is located in a junction box that houses the voltage clipping and/or bypass circuitry. In other embodiments, the voltage can be measured within the PV laminate.

Although much of the description focuses on measuring voltage and clipping voltage, in some embodiments, instead of or in addition to measuring voltage at 1002, current can be measured across a cell, a string of cells, strings of cells, each string of cells, or across one or more modules.

As shown at 1004, whether the measured voltage exceeds a threshold or falls below a threshold can be determined. As described herein, in one embodiment, a controller can be programmed with one or more threshold voltages (and/or current), for example $V_{mpp}$ for a voltage clipping application or 0V for a hot spot protection application, or in some instances, with multiple threshold voltages, such as one for voltage clipping and one for hot spot protection. Note that the controller can be programmed with separate threshold voltages for each string of a PV module. For instance, the controller can be programmed with three voltage clipping threshold voltages, one for each string in a 3-string PV module. In various embodiments, the three voltage clipping threshold voltages may be the same or different from one another.

In one embodiment, the controller can receive an indication of the voltage (and/or current) measured at 1002. Based on a comparison of the received indication of the voltage and the threshold voltage, the controller can determine whether the measured voltage exceeds the clipping threshold voltage or falls below the hot spot threshold voltage. As described herein, such determinations can be made on a string-by-string basis, a cell-by-cell basis, or at the module level, among other examples.

As illustrated at 1006, one or more switches can be closed in response to determining that the voltage exceeds or falls below the threshold. Closing one or more switches can result in preventing voltage from one or more associated solar cells from being provided to the output voltage of a PV module.

In a voltage clipping application, based on the determination that the voltage exceeds the threshold voltage, the controller can either directly enable one or more switches or provide an indication to a driver to enable one or more switches. By enabling the one or more switches, the parallel path is enabled such that the solar cells corresponding to the enabled switch(es) are no longer contributing voltage to the PV module's output.

In one embodiment, the controller can determine which string to clip. For example, the controller can optimize maximum power output by selectively choosing which string's voltage to clip. If the module has a voltage threshold of 60V and string 1 contributes 30V, string 2 contributes 25V, and string 3 contributes 20V, the controller can determine to clip string 3's voltage such that the total voltage from the unclipped strings is below the voltage threshold of 60V but is higher than if string 1 or 2 is clipped.

At 1008, whether to open the one or more switches can be determined. In some embodiments, disengaging, or opening, the switch can be performed based on a timer. For example, the switch can be disengaged after a waiting time period, which can be predetermined or random. As one particular example, the waiting time period can be approximately the relaxation time of an analog circuit. A separate timer and time period can be used for each switch or a common timer and time period can be used for multiple switches (e.g., multiple switches in a single module or across multiple modules). Accordingly, in one embodiment, when the timer expires, the controller can receive an indication of the timer expiration and then disengage the switch or provide an indication to a driver to disengage the switch. The process can repeat (e.g., blocks 1002 and 1004) such that if an overvoltage condition still exists, the switch can be engaged again and the timer may be restarted. If the overvoltage condition no longer exists, the controller can return to normal operation and resume monitoring the voltage.

In some embodiments, determining whether to disengage the switch and return to normal operation can include modeling the PV module's performance to predict the voltage if the switch were to be disengaged. Such a model can be based on data about the PV module, real-time and/or historical measurements of operating parameters, data from a communication system, real-time and/or forecasted weather data, among other data. Based on the model, the controller can make a determination on whether to resume normal operation and disengage the switch(es). The controller can then return to normal operation and resume monitoring voltage.

Another way to determine whether to resume normal operation and disengage the switch(es) is for the controller to short each string in succession while leaving the remaining two strings open. By shorting each of the three strings in succession, any bypass mode can be exited for at least long enough for the controller to perform a measurement. The controller can be configured to solve a system of equations to determine the total voltage that would be produced if any combination or all of the bypass switches are disengaged. When the determined total voltage is below the threshold voltage, the controller can configure the switches for normal operation (all switches for that module open). If the determined total voltage is above the threshold voltage, the controller can configure the switches such that results in the greatest power production without exceeding the predetermined voltage limit.

As a practical example for a 3-string PV module, string 3 can be shorted while strings 1 and 2 are not shorted with strings 1 and 2 producing a total voltage from strings 1 and 2 of $a+b=X$. Similarly, string 1 can be shorted while strings 2 and 3 are not shorted resulting in a total voltage from strings 2 and 3 of $b+c=Y$. String 2 can be shorted while strings 1 and 3 are not shorted to produce total voltage $a+c=Z$. The system of equations can be solved to determine the voltage contribution a from string 1, b from string 2, and c from string 3. Voltages a, b, and, c can be summed to determine if the total voltage is safe or if one of the strings should be clipped.

As noted above, the controller can determine which string should be clipped to optimize power production while still being below the predetermined voltage limit Using a simple numerical example, if the threshold voltage for a module is 60V and the sum of strings 1 and 2 is measured 50V, the sum of strings 2 and 3 is measured at 45V, and the sum of strings 1 and 3 is measured at 45V, then it can be determined that the contribution from string 1 is 25V, from string 2 is 25V, and string 3 is 20V. The controller can configure the switches in an optimal manner such that string 3 is bypassed and strings 1 and 2 provide voltage to the output for a total of 50V rather than the alternative of 45V.

In one embodiment, a current can be measured across the plurality of solar cells. Based on the measured current, the voltage can be estimated. With the estimated voltage, it can be determined whether the voltage would exceed the threshold voltage. The switch(es) can then be opened if it is determined that the voltage is safe and no longer needs to be clipped.

As noted above, although much of the description focused on voltage clipping, the method of FIG. 10 can apply equally in the current clipping context or hot spot bypass context.

Figure 11:
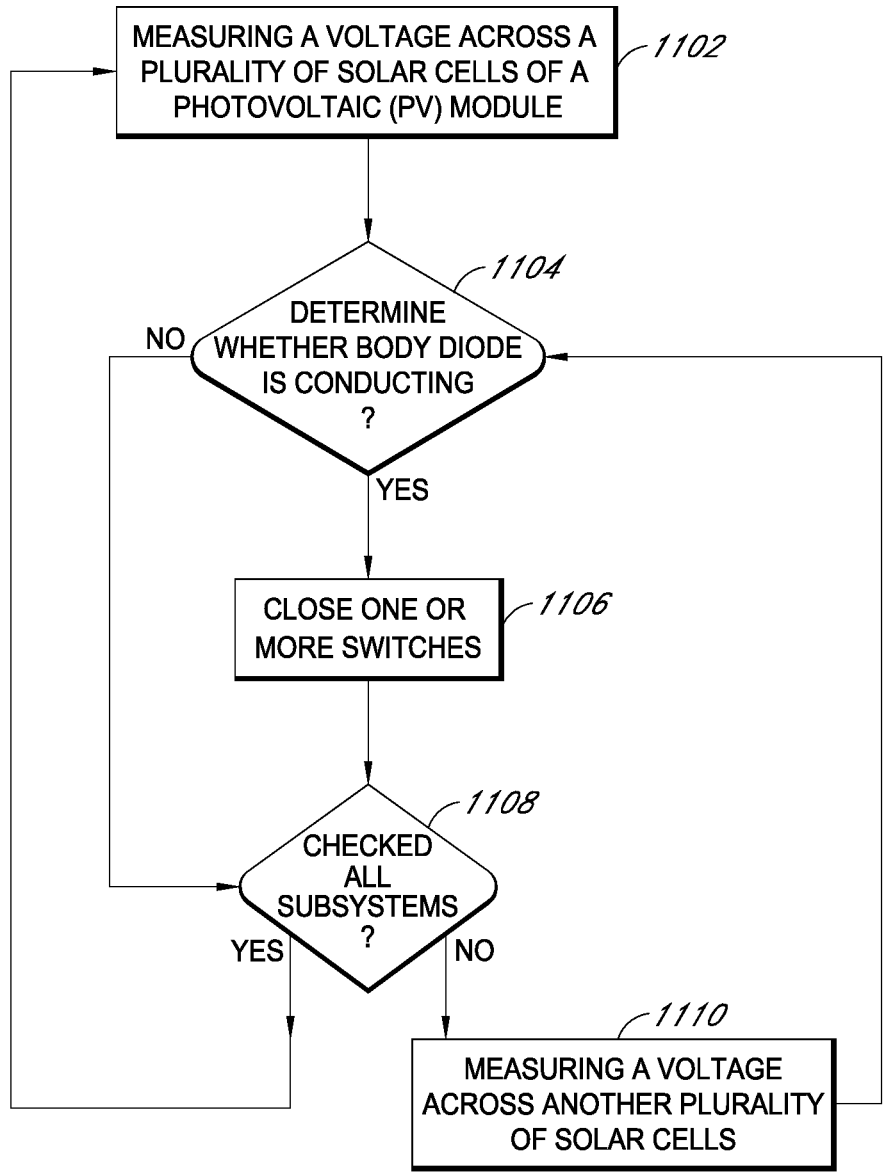

Turning now to FIG. 11, a flow chart illustrating a method for clipping voltage or otherwise bypassing solar cells in a PV module is shown, according to some embodiments. Specifically, the flow chart illustrates a control mechanism for the bypasses switches. In various embodiments, the method of FIG. 11 may include additional (or fewer) blocks than illustrated.

Similar to block 1002 of FIG. 10, at 1102, a voltage can be measured across a plurality of solar cells of a PV module. In various embodiments, the voltage can be measured across a cell, a single string of solar cells, multiple strings of solar cells, each string of solar cells in a PV module, or across one or more modules. In one embodiment, the voltage can be measured with a voltage sensing circuit that is located in a junction box that houses the voltage clipping and/or bypass circuitry. In other embodiments, the voltage can be measured within the PV laminate.

Although much of the description focuses on measuring voltage and clipping voltage, in some embodiments, instead of or in addition to measuring voltage at 1102, current can be measured across a cell, a string of cells, strings of cells, each string of cells, or across one or more modules.

As shown at 1104, whether a body diode (or other diode) is conducting can be determined. And as illustrated at 1006, one or more switches can be closed in response to determining that the diode is conducting. In one embodiment, heat dissipation can be reduced during cell string bypass by engaging the switch of the parallel conduction path when a bypass condition is detected to reduce the voltage drop across the body diode (or other diode). In one embodiment, a FET can be turned on when the voltage across the body diode is in a predefined range.

At 1108, it is determined whether all subsystems have been checked. If not, in one embodiment, a controller can iterate across each subsystem (e.g., cell string) containing a bypass FET and measure the voltage across the body diode of the FET while the FET is open. If the controller determines that the body diode is conducting, then a bypass condition is present and the controller will engage the bypass switch by closing the FET. In either case, the controller can then iterate to the next subsystem or reset to the first subsystem to restart the process.

In one embodiment, the switch opening or closing the parallel path can be controlled locally, with no reliance on external system communication (e.g., a central controller). In other embodiments, switching can be controlled by a central authority through wired or wireless communication to the distributed devices. In another embodiment, switching can be determined by the local controller using one or more parameters (e.g., maximum voltage) that are transmitted to the local controller by a central controller. The parameters can be updated during operation of the system.

Various components of the disclosed circuitry and/or one or more portions of the disclosed techniques can be implemented by a processor unit executing program instructions stored on a memory. In various embodiments, the processor unit can include one or more processors or cores. The processor unit can contain a cache or other form of on-board memory. The memory is usable by the processor unit (e.g., to store instructions executable by and data used by the processor unit). The memory can be implemented by any suitable type of physical memory media, including hard disk storage, floppy disk storage, removable disk storage, flash memory, random access memory (RAM—SRAM, EDO RAM, SDRAM, DDR SDRAM, Rambus® RAM, etc.), ROM (PROM, EEPROM, etc.), and so on. The memory can consist solely of volatile memory in one embodiment.

The circuitry can include an I/O interface configured to couple to and communicate with other devices (e.g., to receive a value representing the threshold voltage), according to various embodiments.

Articles of manufacture that store instructions (and, optionally, data) executable by a computer system to implement various techniques disclosed herein are also contemplated. These articles of manufacture include tangible computer-readable memory media. The contemplated tangible computer-readable memory media include portions of the memory subsystem of computer system 600 (without limitation SDRAM, DDR SDRAM, RDRAM, SRAM, flash memory, and various types of ROM, etc.), as well as storage media or memory media such as magnetic (e.g., disk) or optical media (e.g., CD, DVD, and related technologies, etc.). The tangible computer-readable memory media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A photovoltaic (PV) module, comprising:
   a plurality of solar cells, wherein the plurality of solar cells includes a solar cell string;
   circuitry configured to switch between
      a first state in which output voltage from the PV module includes voltage from the plurality of solar cells, and
      a second state in which at least some of the plurality of solar cells are bypassed from providing voltage to the output voltage; and
   a backup analog fail-safe mechanism coupled with the circuitry, the backup analog fail-safe mechanism comprising a zener diode, wherein the zener diode controls a switch in parallel with the solar cell string.

2. The PV module of claim 1, wherein the circuitry comprises an electronic switch configured to switch between the first and second states.

3. The PV module of claim 1, wherein the plurality of solar cells includes a plurality of additional strings of solar cells, wherein, in the second state, one or more strings of the plurality of strings of solar cells are bypassed from providing to the output voltage.

4. The PV module of claim 3, wherein the circuitry includes a separate switch corresponding to each string of the plurality of additional strings of solar cells.

5. The PV module of claim 4, wherein, in the second state, at least one of the separate switches is closed to bypass its corresponding string of solar cells.

6. The PV module of claim 1, wherein the output voltage from the PV module in the second state is 25% lower than the output voltage from the PV module in the first state.

7. The PV module of claim 1, further comprising:
   a voltage sensing device configured to sense a voltage;
   wherein the circuitry is configured to switch from the first state to the second state based on the sensed voltage exceeding a threshold voltage.

8. The PV module of claim 1, further comprising:
   additional circuitry configured to limit current from one or more of the plurality of solar cells.

9. A voltage limiting device, comprising:
   circuitry configured to switch between
      a first state in which output voltage from a photovoltaic module includes voltage from each string of a plurality of strings of solar cells of the photovoltaic module, and
      a second state in which the output voltage from the photovoltaic module includes voltage from fewer than all of the plurality of strings of solar cells; and
   a backup analog fail-safe mechanism coupled with the circuitry, the backup analog fail-safe mechanism comprising a zener diode, wherein the zener diode controls a switch in parallel with one of the plurality of solar cell strings.

10. The voltage limiting device of claim 9, wherein the circuitry comprises a respective switch corresponding to each string of the plurality of strings of solar cells.

11. The voltage limiting device of claim 9, wherein, in the second state, the output voltage is 25% lower than the output voltage in the first state.

12. The voltage limiting device of claim 9, wherein the circuitry is configured to limit current in response to a voltage of a string of solar cells dropping to 0V.

13. The voltage limiting device of claim 12, wherein the circuitry configured to limit current includes one or more switches configured to limit current in response to the voltage of the string of solar cells dropping to 0V.

14. A method for bypassing one or more cells of a photovoltaic (PV) module, the method comprising:
measuring a voltage across a plurality of solar cells of the PV module, wherein the plurality of solar cells includes a solar cell string;
determining whether the voltage exceeds or falls below a threshold; and
in response to determining that the voltage exceeds or falls below the threshold, closing one or more switches to bypass one or more of the plurality of solar cells, wherein a backup signal is generated from a backup analog fail-safe mechanism if the measured voltage exceeds a reference voltage, the backup analog fail-safe mechanism comprising a zener diode, wherein the zener diode controls a switch in parallel with the solar cell string.

15. The method of claim 14, wherein said determining comprises determining that the voltage exceeds the threshold, and wherein said closing one or more switches results in preventing voltage from the one or more solar cells from being provided to an output voltage of the PV module.

16. The method of claim 15, further comprising:
measuring a current across the plurality of solar cells of the PV module;
based on the measured current, determining that the voltage would not exceed the threshold; and
opening the one or more switches to permit the voltage from the one or more of the plurality of solar cells to be provided to the output voltage of the PV module.

17. The method of claim 14, wherein said determining comprising determining that the voltage falls below the threshold of zero volts.

18. The method of claim 14, wherein closing one or more switches includes closing a single switch to prevent a string of solar cells from providing voltage to the output voltage.

19. The method of claim 14, further comprising:
waiting a period of time;
opening the one or more switches; and
measuring the voltage across the plurality of solar cells of the PV module.

* * * * *